(12) United States Patent
Kinnaird (10) Patent No.: US 11,242,788 B2
(45) Date of Patent: Feb. 8, 2022

(54) MIXER AND DOSER CONE ASSEMBLY WITH INJECTOR FOR LOW TEMPERATURE CONDITIONS

(71) Applicant: Faurecia Emissions Control Technologies, USA, LLC, Columbus, IN (US)

(72) Inventor: Edward Kinnaird, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/960,273

(22) PCT Filed: Jan. 9, 2018

(86) PCT No.: PCT/US2018/012865
§ 371 (c)(1),
(2) Date: Jul. 6, 2020

(87) PCT Pub. No.: WO2019/139560
PCT Pub. Date: Jul. 18, 2019

(65) Prior Publication Data
US 2021/0071559 A1 Mar. 11, 2021

(51) Int. Cl.
*F01N 3/20* (2006.01)
*F01N 3/28* (2006.01)
(Continued)

(52) U.S. Cl.
CPC ......... *F01N 3/208* (2013.01); *B01D 53/9418* (2013.01); *B01D 53/9495* (2013.01);
(Continued)

(58) Field of Classification Search
CPC ............ B01D 53/9418; B01D 53/9495; B01F 3/04014; B01F 3/04049; B01F 5/0473;
(Continued)

(56) References Cited

U.S. PATENT DOCUMENTS 9,429,060 B2   8/2016   Henry et al.
9,771,850 B2   9/2017   Henry et al.
(Continued)

FOREIGN PATENT DOCUMENTS

CN   104364487 A   2/2015
CN   104736807 A   6/2015
(Continued)

OTHER PUBLICATIONS

CN Official Action dated Jul. 2, 2021 for CN Application No. 201880084995.0.

*Primary Examiner* — Audrey B. Walter
(74) *Attorney, Agent, or Firm* — Carlson, Gaskey & Old, P.C.

(57) ABSTRACT

A vehicle exhaust system includes a mixer assembly for a vehicle exhaust system. The mixer assembly includes a mixer housing that defines an internal cavity and which includes at least one injection opening. A manifold is positioned within the internal cavity at the injection opening. A primary injector is configured to inject fluid through the injection opening and into the internal cavity, and at least one secondary injector, which is separate from the primary injector, is configured to inject fluid into the internal cavity when operating temperatures fall below a predetermined level.

21 Claims, 7 Drawing Sheets

(51) Int. Cl.
*B01D 53/94* (2006.01)
*B01F 3/04* (2006.01)
*B01F 5/04* (2006.01)
*B01F 5/00* (2006.01)

(52) U.S. Cl.
CPC ...... *B01F 3/04014* (2013.01); *B01F 3/04049* (2013.01); *B01F 5/0473* (2013.01); *F01N 3/2066* (2013.01); *F01N 3/2892* (2013.01); *B01F 2005/0017* (2013.01); *F01N 2240/20* (2013.01); *F01N 2610/02* (2013.01); *F01N 2610/146* (2013.01); *F01N 2900/1602* (2013.01)

(58) Field of Classification Search
CPC ........... B01F 2005/0017; F01N 3/2066; F01N 3/208; F01N 3/2892; F01N 2240/20; F01N 2610/02; F01N 2610/146; F01N 2900/1602
See application file for complete search history.

(56) References Cited

U.S. PATENT DOCUMENTS

| | | |
|---|---|---|
| 2015/0040547 A1 | 2/2015 | Brockman et al. |
| 2015/0052878 A1 | 2/2015 | Qi |
| 2016/0090887 A1* | 3/2016 | Mitchell ................. F01N 3/208 60/274 |
| 2016/0319724 A1 | 11/2016 | Alano et al. |
| 2016/0361694 A1 | 12/2016 | Brandl et al. |
| 2017/0051654 A1* | 2/2017 | Gupta ..................... F01N 3/035 |
| 2017/0107882 A1* | 4/2017 | Chiruta ................. F01N 3/2066 |
| 2017/0191395 A1 | 7/2017 | Alano et al. |
| 2018/0087426 A1* | 3/2018 | Dou ................... B01D 53/9495 |

FOREIGN PATENT DOCUMENTS

| | | |
|---|---|---|
| CN | 106812572 A | 6/2017 |
| JP | 2009002213 A | 1/2009 |
| JP | 2014095367 A | 5/2014 |

\* cited by examiner

MIXER AND DOSER CONE ASSEMBLY WITH INJECTOR FOR LOW TEMPERATURE CONDITIONS

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF), or reducing agent such as a solution of urea and water for example, upstream of a selective catalytic reduction (SCR) catalyst. A mixer is positioned upstream of the SCR catalyst and mixes engine exhaust gases and products of urea transformation such as ammonia. The injection system includes a doser that sprays the urea into the exhaust stream. The urea should be transformed as much as possible into ammonia ($NH_3$) before reaching the SCR catalyst. As such, the droplet spray size plays an important role in reaching this goal. Larger droplets may not be able to sufficiently transform within more compact mixer configurations.

Additional areas of concern are raised under low temperature operating conditions. When exhaust gas temperatures fall below certain levels, the effectiveness of injected urea spray may be reduced and deposit formation may increase. As the industry moves toward providing more compact exhaust systems, solutions are needed to provide adequate transformation of urea into ammonia under high and low temperature operating conditions for mixers having reduced volumes.

SUMMARY OF THE INVENTION

In one exemplary embodiment, a mixer assembly includes a mixer housing that defines an internal cavity and which includes at least one injection opening. A manifold is positioned within the internal cavity at the injection opening. A primary injector is configured to inject fluid through the injector opening and into the internal cavity, and at least one secondary injector, which is separate from the primary injector, is configured to inject fluid into the internal cavity when operating temperatures fall below a predetermined level.

In another exemplary embodiment, a vehicle exhaust system includes a first exhaust component configured to receive engine exhaust gases, a second exhaust component downstream of the first exhaust component, and a mixer that is positioned between the first and second exhaust components. The mixer includes an outer housing defining an internal cavity that receives the engine exhaust gases from the first component and which includes at least one injection opening. An injection system is configured to inject fluid through the injection opening and into the internal cavity to mix with the engine exhaust gases that are to be directed to the second exhaust component. The injection system includes a primary supplier configured to supply fluid through the injection opening and into the mixer, and at least one secondary supplier separate from the primary supplier to supply fluid into the mixer when operating temperatures fall below a predetermined level.

In one exemplary method for injecting a reducing agent into an exhaust component, the steps include: providing a mixer housing defining an internal cavity, the mixer housing including at least one injection opening; positioning a manifold within the internal cavity at the injection opening; positioning a primary supplier to supply fluid through the injector opening and into the mixer housing; and positioning at least one secondary supplier separate from the primary supplier to supply fluid into the mixer housing only when operating temperatures fall below a predetermined level.

In a further embodiment of any of the above, an inner wall is positioned within the internal cavity and spaced inwardly of an inner surface of the mixer outer housing by a gap. A manifold is positioned within the gap at the injection opening such that one or more manifold channels are provided between the manifold and the inner wall, and wherein the secondary supplier or injector supplies fluid into at least one of the manifold channels.

In a further embodiment of any of the above, a cone is supported within the manifold and has an inlet end aligned with the injection opening, and wherein the primary supplier or injector includes a doser that injects fluid into the inlet end of the cone.

In a further embodiment of any of the above, the at least one secondary supplier comprises at least one dosing tube.

In a further embodiment of any of the above, the primary and secondary suppliers are connected to independent fluid supplies.

In a further embodiment of any of the above, a control controls supply to the primary and secondary suppliers independently of each other.

These and other features of this application will be best understood from the following specification and drawings, the following of which is a brief description.

DETAILED DESCRIPTION

Figure 1:
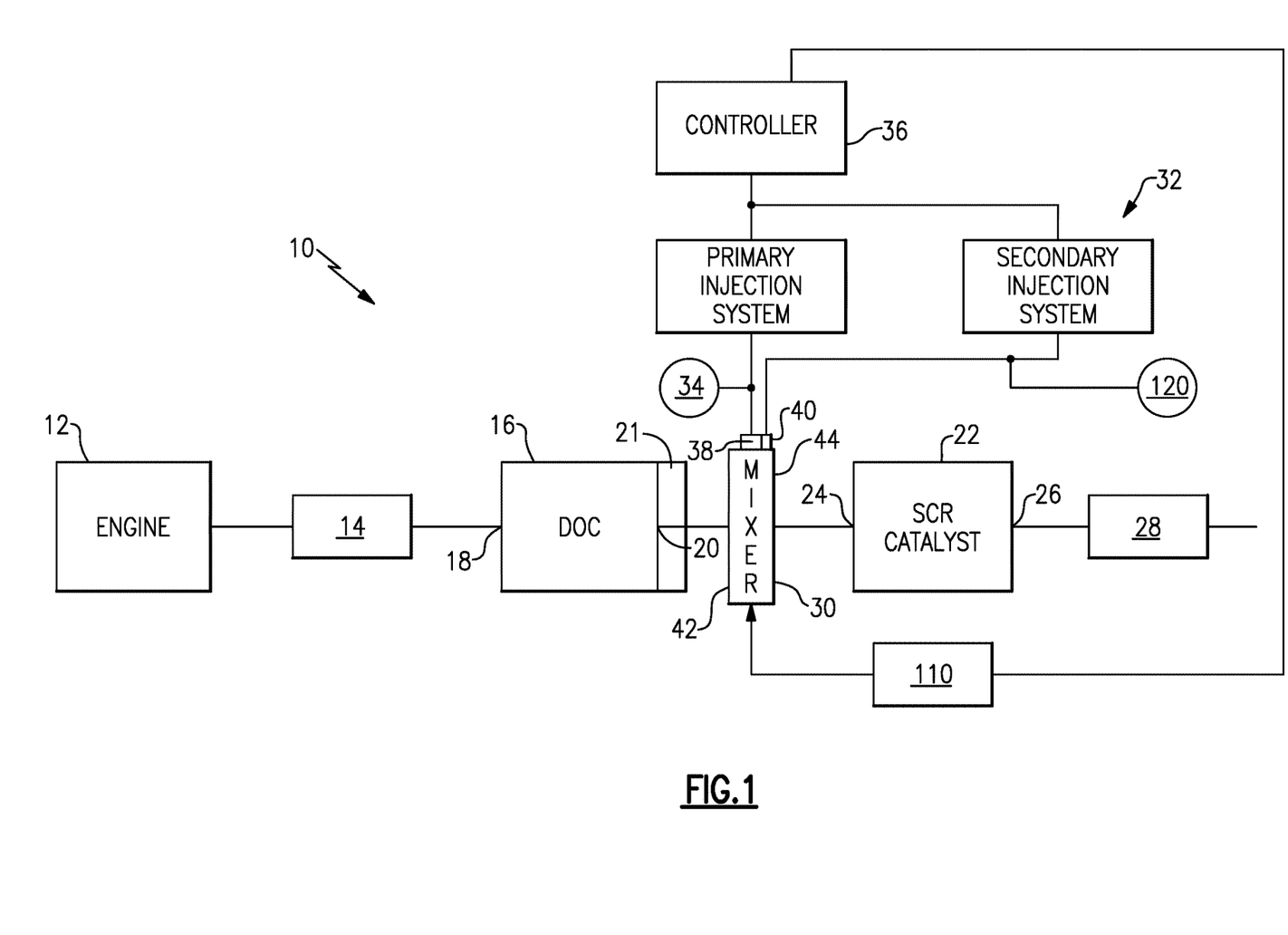
FIG. 1 schematically illustrates one example of an exhaust system with a mixer and injection system according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, tubes, connectors, filters, valves, catalysts, mufflers, resonators, etc. In one example configuration, the upstream exhaust components 14 direct engine exhaust gases into a diesel oxidation catalyst (DOC) 16 having an inlet 18 and an outlet 20.

Downstream of the DOC 16 there may be a diesel particulate filter (DPF) 21 that is used to remove contaminants from the exhaust gas as known. Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, tubes, connectors, filters, valves, catalysts, mufflers, resonators, etc. These upstream 14, downstream 28, and other various components 16, 21, 44, 22 can be mounted in various different configurations and combinations dependent upon vehicle application and available packaging space.

In one example configuration, a mixer 30 is positioned downstream from the outlet 20 of the DOC 16 or DPF 21 and upstream of the inlet 24 of the SCR catalyst 22. The upstream catalyst and downstream catalyst can be in-line or in parallel. The mixer 30 is used to generate a swirling or rotary motion of the exhaust gas.

An injection system 32 is used to inject a diesel exhaust fluid and/or reducing agent, such as a solution of urea and water for example, into the exhaust gas stream upstream from the SCR catalyst 22 such that the mixer 30 can mix the fluid and exhaust gas thoroughly together. The injection system 32 injects the fluid into the exhaust gas flow such that the urea droplets go through vaporization and hydrolysis reactions to form ammonia gas. The mixer 30 thoroughly mixes the ammonia gas with the exhaust gas flow prior to directing the mixture to the SCR catalyst 22. The ammonia adsorbs on the catalyst and reacts with NOx as known.

The injection system 32 includes a fluid supply 34, a controller 36 that controls injection of the fluid, a primary supplier or injector 38, and a secondary supplier or injector 40. In one example, the primary injector 38 comprises a doser that injects the fluid into the mixer 30. In one example, the secondary injector 40 comprises at least one dosing tube that supplies fluid into the mixer 30. This will be discussed in greater detail below.

The mixer 30 comprises a mixer body having an inlet end 42 configured to receive the engine exhaust gases and an outlet end 44 to direct a mixture of swirling engine exhaust gas and products transformed from urea to the SCR catalyst 22. Examples of a mixer 30 that can be used in the exhaust system 10 can be found in US 2012/0216513 and U.S. application Ser. No. 12/576,93, Ser. No. 12/578,86, and Ser. No. 12/577,68 which are also assigned to the assignee of the present application and are hereby incorporated by reference.

As shown in one example configuration, the mixer 30 (FIG. 2A) comprises a mixer outer housing 46 with the inlet end 42 configured to receive the engine exhaust gases and the outlet end 44 configured to direct a mixture of swirling engine exhaust gas and products transformed from urea to the SCR catalyst 22. Further, the mixer 30 includes an upstream baffle 50 (FIGS. 2A-2B) and a downstream baffle 52 (FIG. 3) that are surrounded by the outer housing 46. The upstream baffle 50 is configured to initiate swirling of the exhaust gas flow. The outer housing 46 includes an outer peripheral surface 54 and an inner peripheral surface 56 that faces inwardly toward a mixer center axis A.

Figure 2A:
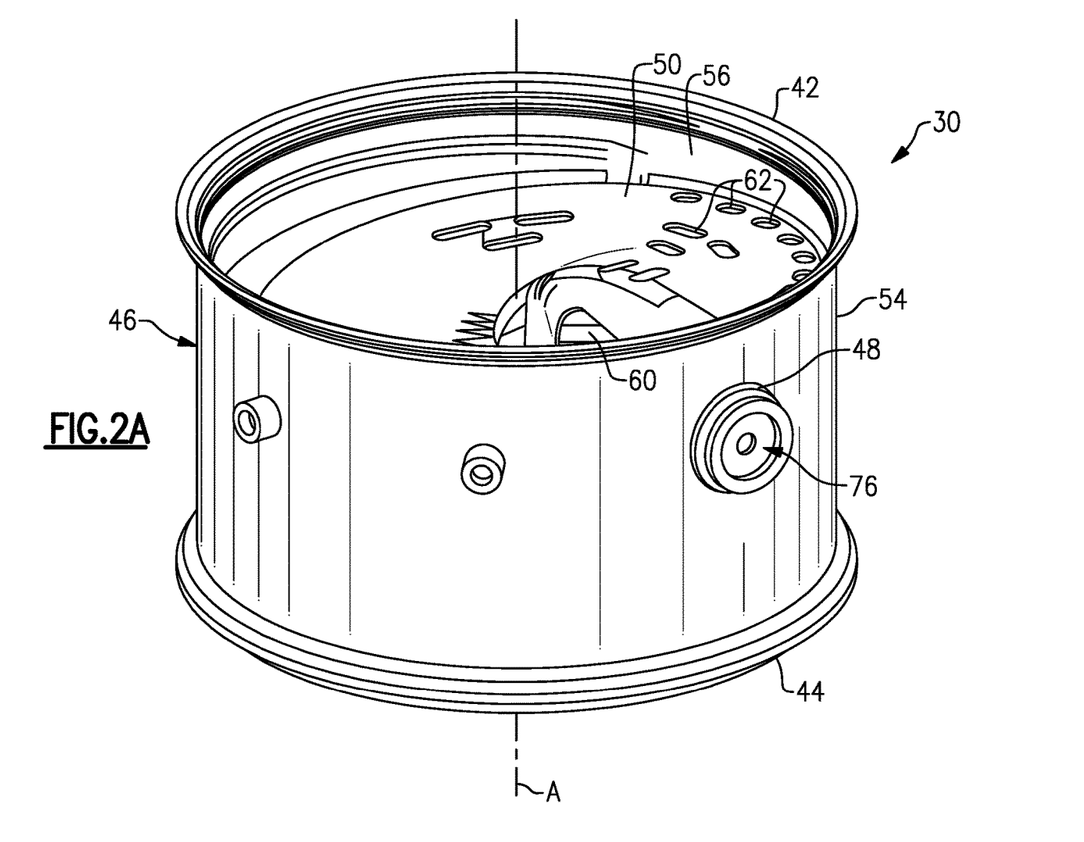
FIG. 2A is a perspective view of an upstream end of a mixer according to the subject invention.
Figure 2B:
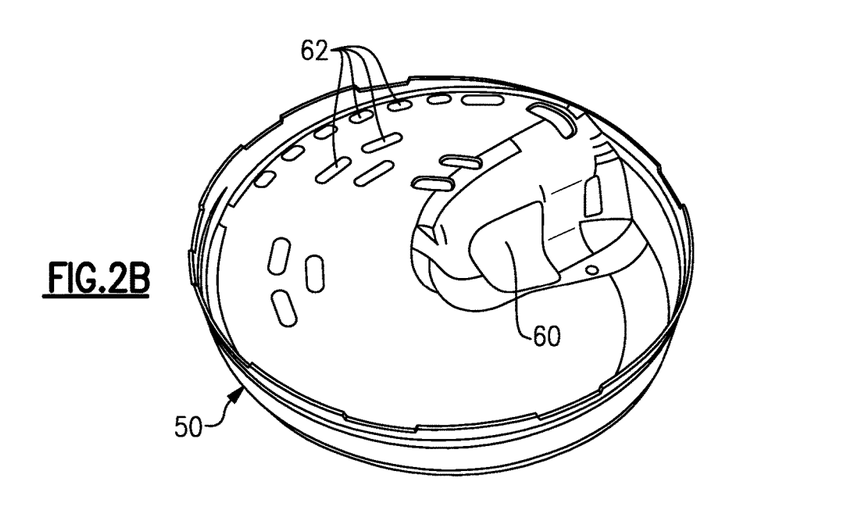
FIG. 2B is a perspective of an upstream baffle from FIG. 2A.

The upstream baffle 50 at the inlet end 42 may include a large inlet opening 60 that can receive the majority of the exhaust gas (for example, the large inlet opening 60 receives approximately 60% of the exhaust mass flow rate), and which is configured to initiate the swirling motion. The upstream baffle 50 may also include a plurality of perforations, slots, or additional inlet openings 62 that ensure optimal homogenization of exhaust gases and reduces back pressure. The upstream baffle 50 and the plurality of inlet openings 60, 62 cooperate to initiate a swirling motion to the exhaust gas as the exhaust gas enters the inlet end 42 of the mixer 30. It should be understood that the disclosed upstream baffle 50 is just one example of an upstream baffle and that the baffle can comprise different shaped configurations and/or different numbers and patterns of openings.

Figure 3:
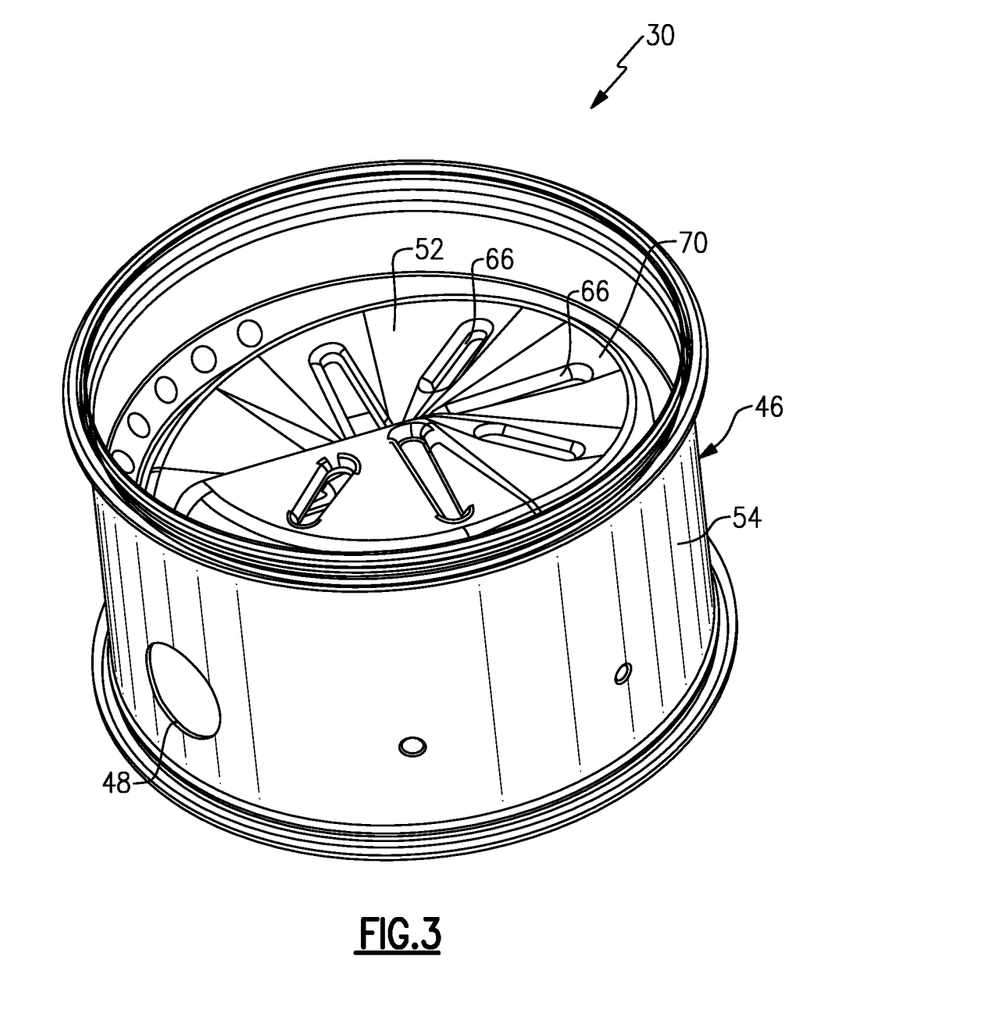
FIG. 3 is a perspective view of a downstream end of the mixer according to the subject invention.

The downstream baffle 52 may include a large outlet opening 64 through which the majority of the exhaust gas exits. The downstream baffle 52 may also include one or more additional outlet openings 66 through which the exhaust gas exits. In one example, the downstream baffle 52 comprises a helical portion 70 and the large outlet opening 64 comprises a primary outlet opening and is larger than the other outlet openings 66. The helical portion 70 may include the additional outlet openings 66. It should be understood that the disclosed downstream baffle 52 is just one example of a downstream baffle and that the baffle can comprise different shaped configurations and/or different numbers and patterns of openings.

Figure 4A:
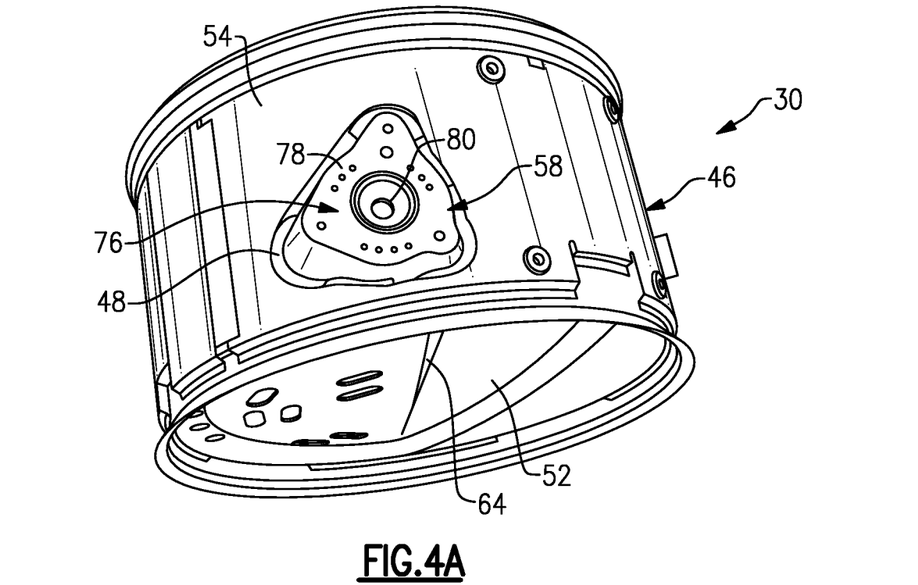
FIG. 4A is a perspective view of a manifold installed in the mixer of FIG. 2A.
Figure 4B:
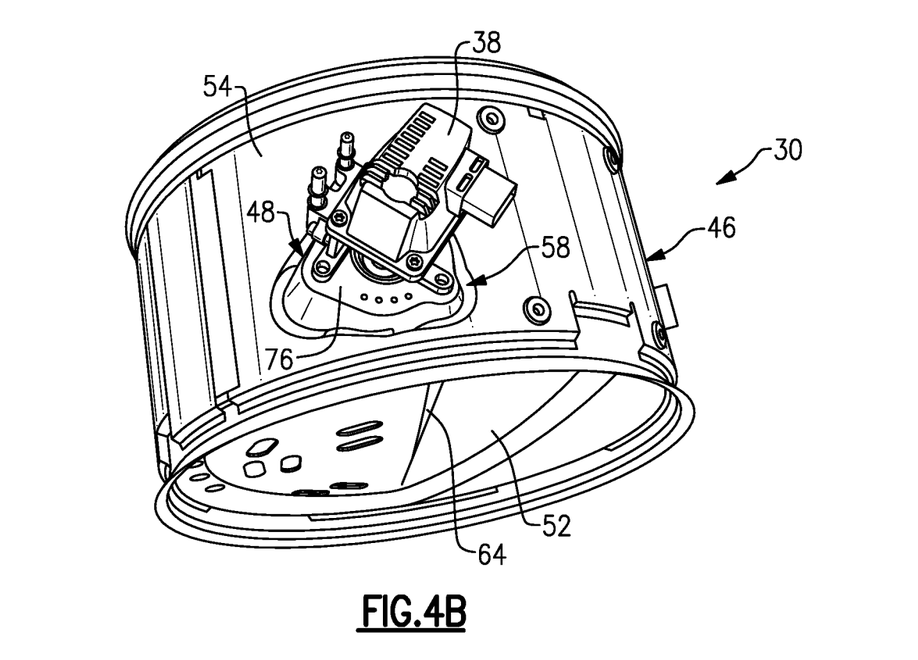
FIG. 4B is similar to FIG. 4A but showing a doser installed on the mixer.

As shown in FIG. 3, the outer peripheral surface 54 of the outer housing 46 includes an opening 48 formed at a location between the upstream 50 and downstream 52 baffles. The opening 48 is configured to receive the primary fluid supplier/injector 38. FIGS. 4A-4B show a sub-assembly 58 that is aligned with the opening 48 to facilitate mounting of the primary injector 38 to the mixer 30 such that spray is introduced into the exhaust gas stream in the desired orientation. In one example, the sub-assembly 58 includes a cone 74 (FIG. 6A) and a manifold 76 (FIG. 4A).

Figure 5A:
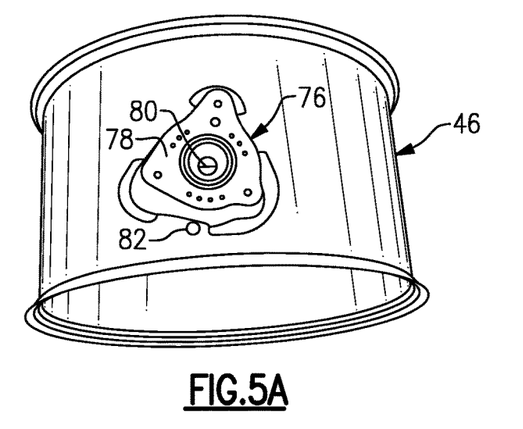
FIG. 5A is a perspective view of an outer housing of the mixer of FIG. 4A showing an opening to receive a secondary injector that is separate from the doser.
Figure 5B:
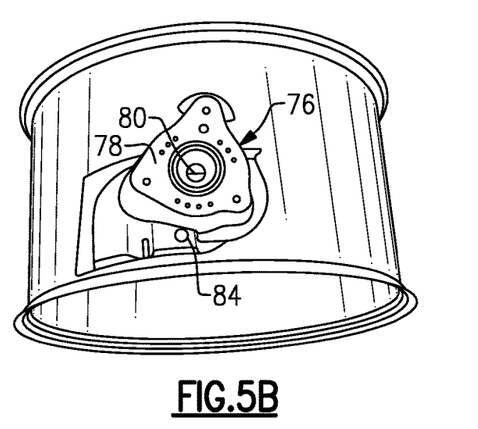
FIG. 5B is similar to FIG. 5A but shows the outer housing as transparent.
Figure 7:
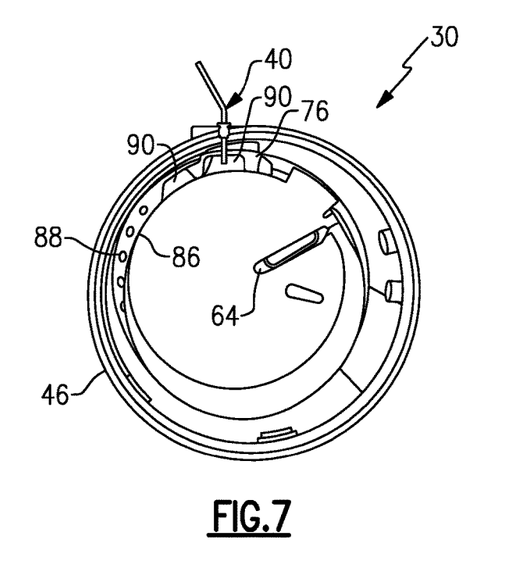
FIG. 7 is an end view of the mixer of FIG. 4A showing the secondary injector as installed in the mixer and manifold.

FIGS. 4A-B show the manifold 76 providing an interface portion 78 with an injection opening 80 that is aligned with the opening 48 in the outer housing 46. The interface portion 78 includes one or more openings to receive fasteners (not shown) such that the primary injector 38 can be mounted to the mixer 30 as shown in FIG. 4B. FIG. 5A shows the outer housing 46 with an opening 82 that is positioned adjacent to the manifold 76, and which is configured to receive the secondary injector 40 (FIG. 7). The manifold 76 includes an opening 84 that is also configured to receive the secondary injector 40 as shown in FIG. 5B. FIG. 5B shows the outer housing 46 as transparent such that it can be seen that the opening 82 in the outer housing 46 aligns with the opening 84 in the manifold 76.

The mixer 30 also includes an inner wall 86 that is positioned within an internal cavity of the outer housing 46, and which is spaced inwardly of the inner peripheral surface 56 of the outer housing 46 by a gap 88 (see FIG. 7). The manifold 76 is positioned within the gap 88 at the injection opening 48 such that one or more manifold channels 90 are provided between the manifold 76 and the inner wall 86. As shown in FIG. 7, in one example, the secondary injector 40 supplies fluid into at least one of the manifold channels 90.

Figure 6A:
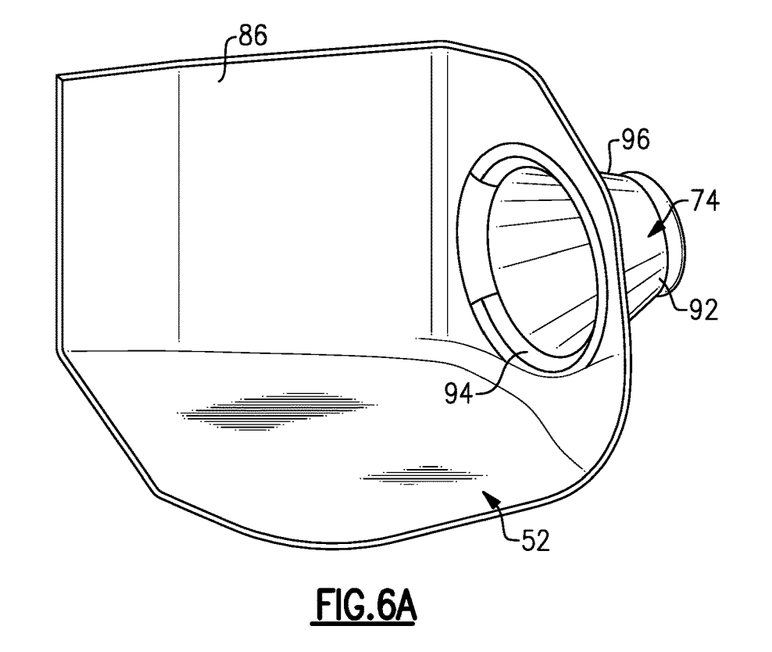
FIG. 6A shows one example of a cone that can be used with the manifold of FIGS. 5A-5B.
Figure 6B:
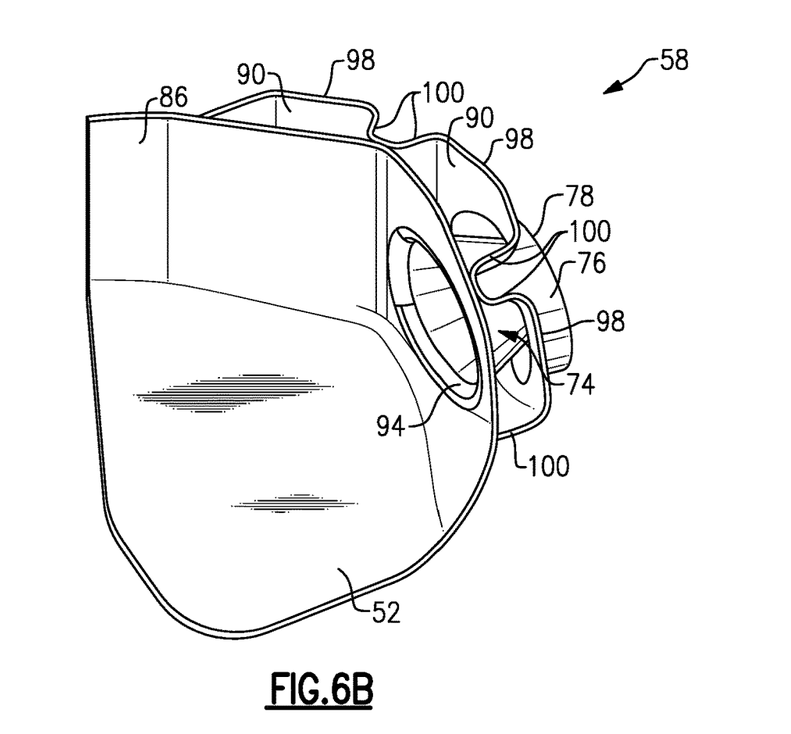
FIG. 6B shows an example of a sub-assembly of the cone and the manifold.

The cone 74 and manifold 76 are shown in greater detail in FIGS. 6A-6B. The cone 74 has a narrow end 92 with an inlet opening and a wide end 94 with an outlet opening. A tapered body portion 96 extends from the narrow end 92 to the wide end 94. The wide end 94 is mounted at an opening formed in the inner wall 86. The manifold 76 includes one or more outer portions 98 that are spaced circumferentially about the interface portion 78 and which are spaced from the inner wall 86. The manifold 76 also includes one or more inwardly extending portions 100 that extend from the outer portions 98 to the inner wall 86 to define the chambers or channels 90. The exhaust gas flow goes through the chambers 90 and is directed to the inlet opening of the cone 74. The inlet opening of the cone 74 is aligned with the injection opening 80 such that the narrow end 92 of the cone 74 fits within the interface portion 78 of the manifold 76.

Figure 8:
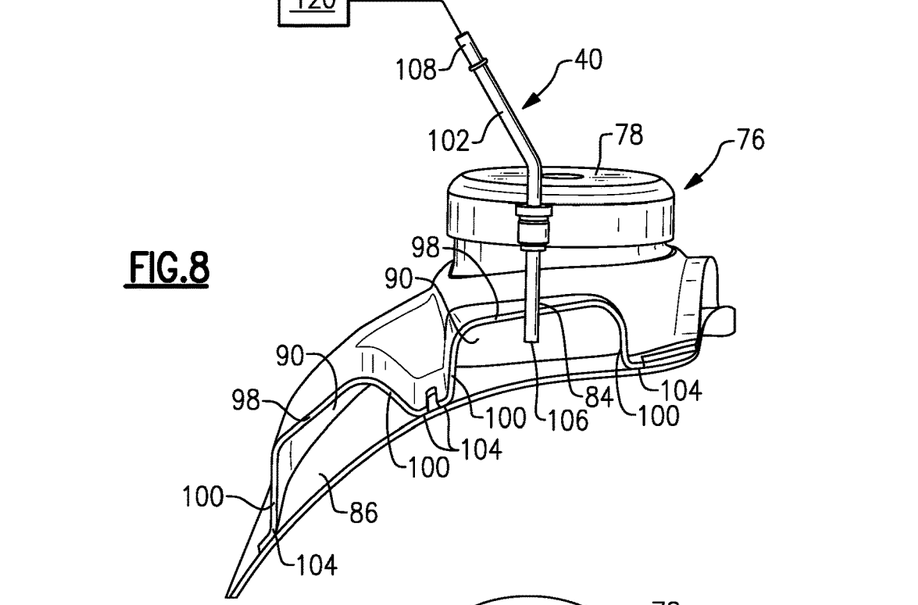
FIG. 8 is an enlarged view of the manifold and secondary injector of FIG. 7.

As shown in FIG. 8, the opening 84 extends through one of the outer portions 98 of the manifold 76. The secondary injector 40 comprises a dosing tube body 102 that extends through the opening 84 and into a manifold channel 90. The manifold channel 90 is defined between at least two inwardly extending portions 100 of the manifold 76 that are connected/attached to the inner wall 86 as indicated at 104. The portions 100 can be attached via welding, brazing, etc., for example. The tube body 102 extends to a distal tip 106 that is positioned within the channel 90 and is spaced from the inner wall 86. An opposite end 108 of the tube body 102 is connected to a secondary fluid supply 120 that is separate from the main fluid supply 34 (FIG. 1).

The fluid supply provides at least one of the following fluids: DEF, urea, ammonia, and other reducing agents suitable for use in a vehicle exhaust gas. When an operating temperature range is as low as 140 degrees Celsius, for example, the controller 36 can activate the secondary injector 40 to inject spray into the mixer 30 to improve mixer efficiency during cold start conditions. The secondary injector 40 may also be configured to inject spray at lower temperatures if needed. In one example, the secondary injector 40 injects fluid within a temperature operating range of 140 degrees Celsius to 180 degrees Celsius. Once the operating temperature reaches a desired temperature, such as 180 degrees Celsius or higher, for example, the secondary injector 40 is shut down. Thus, the secondary injector 40 only operates during cold start or low temperature operating conditions. The controller 36 operates the primary 38 and secondary 40 injectors independently of each other to provide the desired amount of fluid per the various operating conditions. The system can include one or more temperatures sensors 110 as needed in order to identify when to activate the secondary injector 40.

Figure 9:
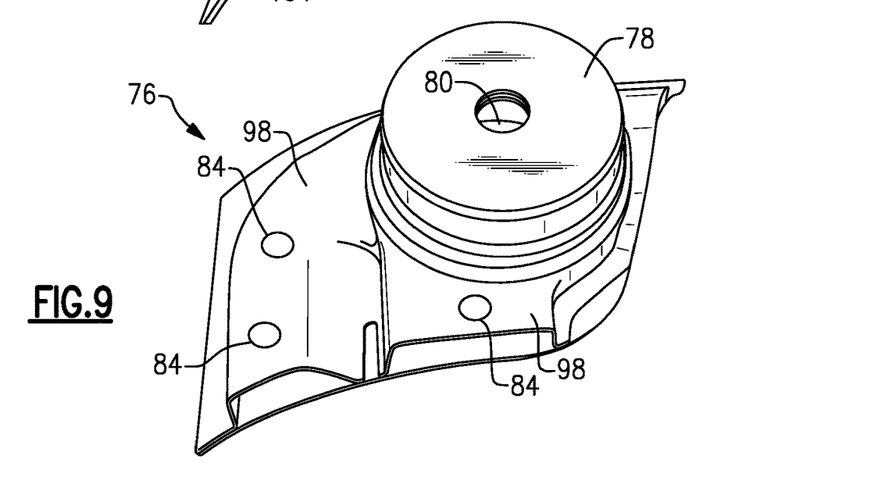
FIG. 9 is a top view of the manifold of FIG. 8.

FIG. 9 shows one example location of the opening 84 that receives the secondary injector 40. Optional locations for the opening 84 are shown in FIG. 9. In one example, only one opening 84 is used. In another example, two or more openings 84 are provided such that multiple dosing tubes 102 can be used. The locations shown in FIG. 9 are suggestions and it should be understood that other locations can be used in addition to, or instead of, the shown locations.

Figure 10:
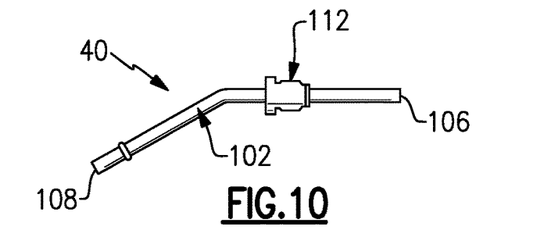
FIG. 10 is a view of the secondary injector and a compression fitting.
Figure 11:
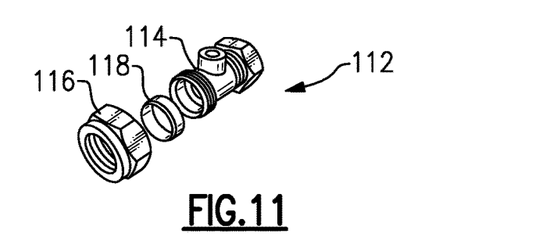
FIG. 11 is an exploded view of the compression fitting of FIG. 10.

In one example shown in FIGS. 10-11, the tube body 102 is attached to the manifold 76 with a compression fitting 112. In one example, the compression fitting 112 includes a first fitting 114 associated with the manifold 76, a coupling nut 116 that surrounds the tube body 102 and couples to the first fitting 114, and a compression ring 118 that surrounds the tube body 102 and is compressed as the nut 116 is tightened with the first fitting 114. When the nut 116 is tightened to a final installation position, a sealed joint is provided between the tube body 102 and mixer outer housing 46. Optionally, the tube body 102 could be welded or brazed to the mixer outer housing.

The subject invention provides a compact mixer that improves mixer operation at cold start conditions. By using a secondary injector that is only active during low temperature conditions, start-up can be performed more quickly, efficiently, and with a wider engine operating range.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mixer assembly for a vehicle exhaust system comprising:
   a mixer housing defining an internal cavity, the mixer housing including at least one injection opening;
   a manifold positioned within the internal cavity at the injection opening, wherein the manifold has an outlet to the internal cavity;
   a primary injector configured to inject fluid through the injection opening and into the internal cavity via the outlet; and
   at least one secondary injector configured to operate separately from the primary injector to inject fluid into the internal cavity via the same outlet when operating temperatures fall below a predetermined level.

2. The mixer assembly according to claim 1 wherein the primary injector is configured to inject a reducing agent through the injection opening and wherein the secondary injector is configured to inject fluid into the manifold only when operating temperatures fall below the predetermined level.

3. The mixer assembly according to claim 1 including a control that is configured to operate the primary injector independently of the secondary injector.

4. The mixer assembly according to claim 1 including a cone supported within the manifold, the cone having an inlet end aligned with the injection opening, and wherein the primary injector comprises a doser that injects fluid into the inlet end of the cone, and wherein the outlet to the internal cavity is at an outlet end of the cone.

5. The mixer assembly according to claim 4 wherein the manifold includes one or more internal manifold chambers, and wherein the at least one secondary injector is configured to inject fluid into at least one of the internal manifold chambers, and wherein the fluid from the at least one secondary injector and exhaust gas flow goes through the one or more internal manifold chambers and is directed to the inlet opening of the cone.

6. The mixer assembly according to claim 1 wherein the manifold includes a first manifold opening aligned with the at least one injection opening and a second manifold opening for the secondary injector, and wherein the at least one secondary injector comprises at least one tube that extends through the mixer housing and into the manifold via the second manifold opening.

7. The mixer assembly according to claim 6 including a compression fitting to secure the tube to the mixer housing.

8. A mixer assembly for a vehicle exhaust system comprising:
   a mixer housing defining an internal cavity, the mixer housing including at least one injection opening;
   a manifold positioned within the internal cavity at the injection opening;
   a primary injector configured to inject fluid through the injection opening and into the internal cavity;

a cone supported within the manifold, the cone having an inlet end aligned with the injection opening, and wherein the primary injector comprises a doser that is configured to inject fluid into the inlet end of the cone; and at least one secondary injector configured to operate separately from the primary injector to inject fluid into the internal cavity when operating temperatures fall below a predetermined level, and wherein the at least one secondary injector is configured to inject fluid into the manifold.

9. The mixer assembly according to claim 8 including an inner wall positioned within the internal cavity and spaced inwardly of an inner surface of the mixer housing by a gap, and wherein the manifold is positioned within the gap such that one or more manifold channels are provided between the manifold and the inner wall, and wherein the secondary injector is configured to inject fluid into at least one of the manifold channels.

10. A vehicle exhaust system comprising:
a first exhaust component configured to receive engine exhaust gases;
a second exhaust component downstream of the first exhaust component;
a mixer positioned between the first and second exhaust components, the mixer including an outer housing that defines an internal cavity to receive the engine exhaust gases from the first component and which includes at least one injection opening; and
an injection system configured to inject fluid through the injection opening and into the internal cavity via an outlet to mix with the engine exhaust gases that are to be directed to the second exhaust component, the injection system including a primary supplier configured to supply fluid through the injection opening and into the mixer via the outlet and at least one secondary supplier configured to operate separately from the primary supplier to supply fluid into the mixer via the same outlet when operating temperatures fall below a predetermined level.

11. The vehicle exhaust system according to claim 10 including an inner wall positioned within the internal cavity and spaced inwardly of an inner surface of the outer housing by a gap, and including a manifold positioned within the gap at the injection opening such that one or more manifold channels are provided between the manifold and the inner wall, and wherein the secondary supplier supplies fluid into at least one of the manifold channels with the fluid exiting the manifold via the outlet.

12. The vehicle exhaust system according to claim 10 including a cone supported within the manifold, the cone having an inlet end aligned with the injection opening, and wherein the primary supplier includes a doser that is configured to inject fluid into the inlet end of the cone, and wherein the manifold includes one or more internal manifold chambers, and wherein the secondary supplier is configured to inject fluid into the one or more internal manifold chambers and which is directed to the inlet opening of the cone.

13. A vehicle exhaust system comprising:
a first exhaust component configured to receive engine exhaust gases;
a second exhaust component downstream of the first exhaust component;
a mixer positioned between the first and second exhaust components, the mixer including an outer housing that defines an internal cavity to receive the engine exhaust gases from the first component and which includes at least one injection opening;
an injection system configured to inject fluid through the injection opening and into the internal cavity to mix with the engine exhaust gases that are to be directed to the second exhaust component, the injection system including a primary supplier configured to supply fluid through the injection opening and into the mixer and at least one secondary supplier configured to operate separately from the primary supplier to supply fluid into the mixer when operating temperatures fall below a predetermined level;
an inner wall positioned within the internal cavity and spaced inwardly of an inner surface of the outer housing by a gap, and including a manifold positioned within the gap at the injection opening such that one or more manifold channels are provided between the manifold and the inner wall, and wherein the secondary supplier supplies fluid into at least one of the manifold channels; and
a cone supported within the manifold, the cone having an inlet end aligned with the injection opening, and wherein the primary supplier includes a doser that is configured to inject fluid into the inlet end of the cone.

14. The vehicle exhaust system according to claim 13 wherein the manifold includes a first manifold opening aligned with the at least one injection opening and a second manifold opening for the secondary supplier, and wherein the at least one secondary supplier comprises at least one dosing tube that is received within the second manifold opening.

15. The vehicle exhaust system according to claim 14 wherein the at least one dosing tube is mounted to the outer housing at a sealed connection interface that is adjacent to the cone.

16. The vehicle exhaust system according to claim 13 wherein the primary and secondary suppliers are connected to independent fluid supplies.

17. The vehicle exhaust system according to claim 16 including a control that is configured to control supply to the primary and secondary suppliers independently of each other.

18. The vehicle exhaust system according to claim 17 wherein the fluid comprises at least one of diesel exhaust fluid and urea, and wherein the control is configured to operate the secondary supplier to inject fluid within a temperature operating range of 140 degrees Celsius to 180 degrees Celsius, and wherein once the operating temperature exceeds 180 degrees Celsius, the control is configured to shut the secondary supplier down.

19. A method for injecting a reducing agent into an exhaust component comprising the steps of:
providing a mixer housing defining an internal cavity, the mixer housing comprising an outer housing including at least one injection opening;
providing an inner wall positioned within the internal cavity and spaced inwardly of an inner surface of the outer housing by a gap;
positioning a manifold within the internal cavity at the injection opening, and positioning the manifold within the gap at the injection opening such that one or more manifold channels are provided between the manifold and the inner wall;
positioning a primary supplier to supply fluid through the injection opening and into the mixer housing; and
positioning at least one secondary supplier separate from the primary supplier to supply fluid into at least one of the manifold channels only when operating temperatures fall below a predetermined level.

20. The method according to claim 19 providing a cone supported within the manifold, aligning an inlet end of the cone with the injection opening, and positioning a doser of the primary supplier to inject fluid into the inlet end of the cone.

21. The method according to claim 20 wherein the manifold includes a first manifold opening aligned with the at least one injection opening and a second manifold opening for the secondary supplier, and wherein the secondary supplier comprises a dosing tube extending through the second manifold opening, and including mounting the dosing tube to the mixer housing at a sealed connection interface at a location that is adjacent to the cone.

* * * * *

UNITED STATES PATENT AND TRADEMARK OFFICE
CERTIFICATE OF CORRECTION

PATENT NO. : 11,242,788 B2
APPLICATION NO. : 16/960273
DATED : February 8, 2022
INVENTOR(S) : Edward Kinnaird It is certified that error appears in the above-identified patent and that said Letters Patent is hereby corrected as shown below:

In the Claims

In Claim 5, Column 6, Line 50; replace "the inlet opening" with --the inlet end--

In Claim 10, Column 7, Line 28; replace "the first component" with --the first exhaust component--

In Claim 12, Column 7, Line 51; replace "the manifold" with --a manifold--

In Claim 12, Column 7, Line 58; replace "the inlet opening" with --the inlet end--

In Claim 13, Column 8, Line 1; replace "the first component" with --the first exhaust component--

Signed and Sealed this
Twenty-fourth Day of May, 2022

Katherine Kelly Vidal
*Director of the United States Patent and Trademark Office*